United States Patent
Wang et al.

(10) Patent No.: US 10,303,642 B2
(45) Date of Patent: May 28, 2019

(54) SYSTEM AND METHOD FOR COMMUNICATING OVER A CONNECTOR DEVICE BASED ON COMPONENT CHARACTERISTICS STORED WITH THE COMPONENTS OF THE CONNECTOR DEVICE

(71) Applicant: DELL PRODUCTS, LP, Round Rock, TX (US)

(72) Inventors: Minchuan Wang, Austin, TX (US); Bhyrav M. Mutnury, Round Rock, TX (US); Stuart Allen Berke, Austin, TX (US); Harry C. Heinisch, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 219 days.

(21) Appl. No.: 15/362,440

(22) Filed: Nov. 28, 2016

(65) Prior Publication Data

US 2018/0150429 A1    May 31, 2018

(51) Int. Cl.
| | |
|---|---|
| *G06F 13/38* | (2006.01) |
| *G06F 13/42* | (2006.01) |
| *G06F 13/36* | (2006.01) |
| *G06F 13/40* | (2006.01) |

(52) U.S. Cl.
CPC .......... *G06F 13/4282* (2013.01); *G06F 13/36* (2013.01); *G06F 13/4068* (2013.01); *G06F 2213/0026* (2013.01); *G06F 2213/0028* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 8,384,522 B2 * | 2/2013 | Macauley | G01S 5/14 340/10.1 |
| 8,644,667 B2 | 2/2014 | Katayama et al. | |
| 8,841,560 B1 | 9/2014 | Roberts | |
| 2003/0007339 A1 | 1/2003 | Harris et al. | |
| 2014/0314405 A1 | 10/2014 | Zhang et al. | |

\* cited by examiner

*Primary Examiner* — Cheng Yuan Tseng
(74) *Attorney, Agent, or Firm* — Larson Newman, LLP

(57) ABSTRACT

An information handling system may include a first computing device, a second computing device, a connector device connecting the first computing device and the second computing device, and a controller. The connector device may be assembled from a set of components, where one or more of the components have a memory storing signal integrity characteristics for the component. The controller may be connected to the component memories, and may also be connected to the first computing device and the second computing device.

20 Claims, 4 Drawing Sheets

SYSTEM AND METHOD FOR COMMUNICATING OVER A CONNECTOR DEVICE BASED ON COMPONENT CHARACTERISTICS STORED WITH THE COMPONENTS OF THE CONNECTOR DEVICE

FIELD OF THE DISCLOSURE

The present disclosure generally relates to information handling systems and connector devices connecting information handling systems, and more particularly relates to communicating over a connector device based on component characteristics stored with components of the connector device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use. In addition, information handling systems can include a variety of hardware and software resources that can be configured to process, store, and communicate information and can include one or more computer systems, computing devices, graphics interface systems, data storage systems, networking systems, server devices, and mobile communication systems.

SUMMARY

An information handling system may include a first computing device, a second computing device, a connector device connecting the first computing device and the second computing device, and a controller. The connector device may be assembled from a set of components, where one or more of the components have a memory storing signal integrity characteristics for the component. The controller may be connected to the component memories, and may also be connected to the first computing device and to the second computing device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
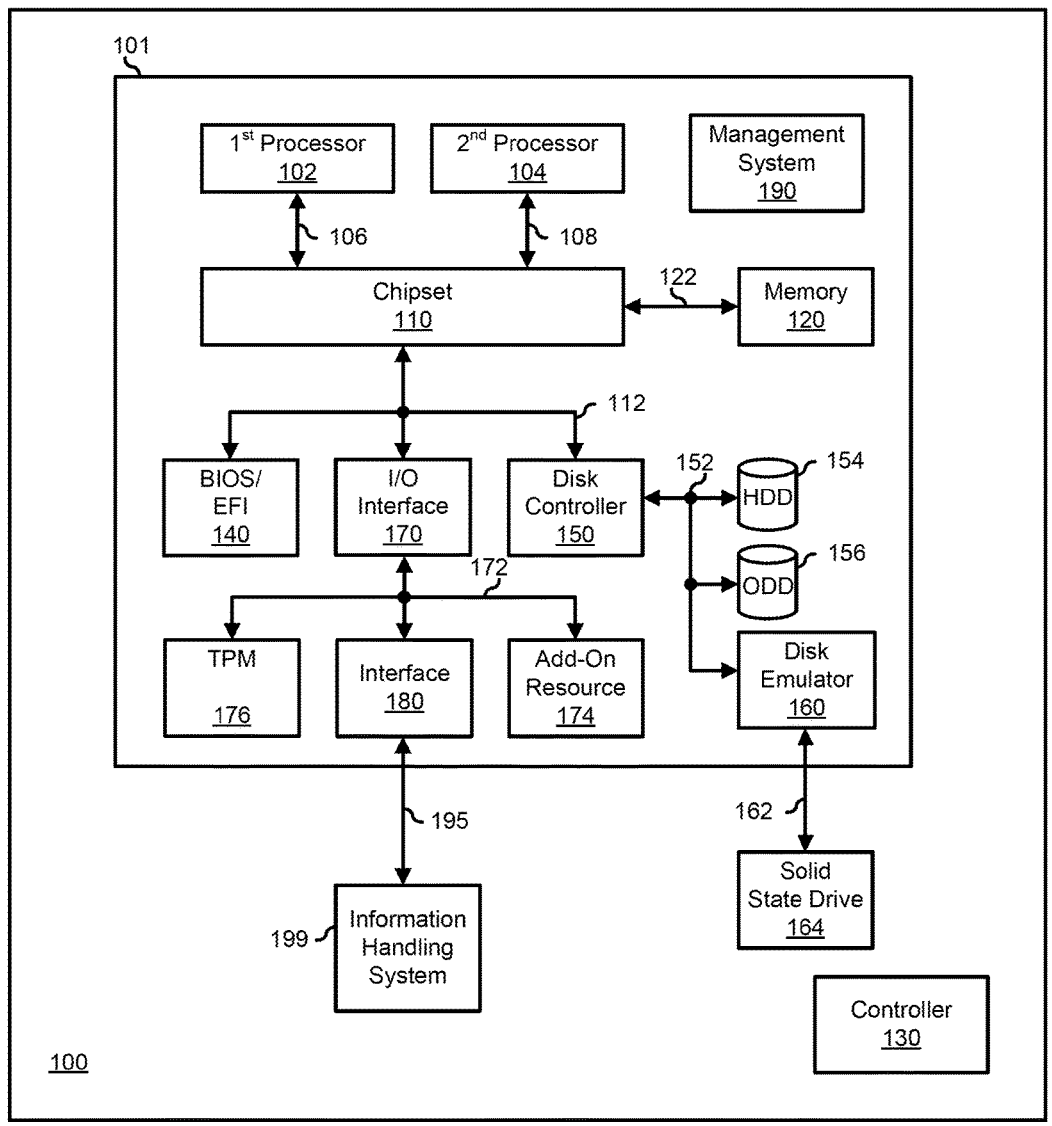
FIG. 1 is a block diagram of a general information handling system according to an embodiment of the present disclosure.

FIG. 1 illustrates a system 100 including information handling system 101 connected to information handling system 199. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components. For example, computing devices may be connected by a connector device.

Information handling system 101 and information handling system 199 are connected by connector device 195. System 100 further includes controller 130. Information handling system 101 can include devices or modules that embody one or more of the devices or modules described above, and operates to perform one or more of the methods described above. Information handling system 101 includes a processors 102 and 104, a chipset 110, a memory 120, includes a basic input and output system/extensible firmware interface (BIOS/EFI) module 140, a disk controller 150, a disk emulator 160, an input/output (I/O) interface 170, an interface 180, and a management system 190. Processor 102 is connected to chipset 110 via processor interface 106, and processor 104 is connected to the chipset via processor interface 108. Memory 120 is connected to chipset 110 via a memory bus 122. In a particular embodiment, information handling system 101 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 101, to provide drivers for the resources, initialize the resources, and access the resources. BIOS/EFI module 140 includes code that operates to detect resources within information handling system 101, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 101 via an external interface 162. An example of external interface 162 includes a USB interface, an IEEE 1394 (Firewire) interface, a proprietary interface, or a combination thereof. Alternatively, solid-state drive 164 can be disposed within information handling system 101.

Management system 190 provides for out-of-band monitoring, management, and control of the respective elements of information handling system 101, such as cooling fan speed control, power supply management, hot-swap and hot-plug management, firmware management and update management for system BIOS or UEFI, Option ROM, device firmware, and the like, or other system management and control functions as needed or desired.

I/O interface 170 includes a peripheral interface 172 that connects the I/O interface to an add-on resource 174, to a TPM 176, and to interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 101, a device that is external to the information handling system, or a combination thereof.

Interface 180 represents a communication interface disposed within information handling system 101, on a main circuit board of the information handling system, integrated onto another component such as chipset 110, in another suitable location, or a combination thereof. Interface 180 provides a connection interface for connection to information handling system 199 with connector device 195.

Information handling systems may subsume information handling systems. As such, system 100 may be an information handling system subsuming information handling system 101 and information handling system 199. Information handling system 101 and information handling system 199 may be server devices or computing devices. Connector device 195 may be comprised of multiple components such as cables, connectors, and printed circuit boards (PCBs) which together may provide one or more channels for communication between server and computing devices. Interior to information handling system 100, information handling system 101 and information handling system 199 may communicate with each other over connector device 195 according to one or more standards.

Devices are assembled from sets of components, the characteristics of the components determining the characteristics of the assembled device. The characteristics of the device determine the functionality of the device.

In component manufacture, characteristics of individual components may be measured and stored with the respective individual component. For example, a non-volatile memory device may be attached to an individual component such that the respective non-volatile memory device forms part of the completed individual component. Respective individual characteristics of the individual components may be measured and then stored in the respective non-volatile memory device attached to the completed individual component.

When different components are assembled into a device or part of a device, the characteristics of the individual components of the device will determine the functionality of the device. To determine whether or to what extent an assembled device is functional for a desired functionality, the respective characteristics of the components of the device may be recovered from respective non-volatile memory devices attached to the components to determine the functionality of the device.

For example, a connector device providing a communication channel according to one or more communication standards between two computing devices may be comprised of individual components such as a controller component, a cable component, a midplane component, a connector component and a backplane component. Each of these individual components will have individual communications characteristics, referred to as signal integrity characteristics. These signal characteristics may be measured and stored on respective memories attached to the components themselves. Examples of signal integrity characteristics include impedance, crosstalk, and loss per inch. When, for example, an individual controller component, cable component, midplane component, connector component and backplane component are assembled into an individual connector device, the individual signal integrity characteristics of the components will determine the signal integrity characteristics of the individual connector device and the communication channel the connector device provides. In turn, the signal integrity characteristics of the individual connector device determine the functionality of the communication channel the connector device provides and thus the functionality of connector device itself. Thus, the characteristic of the individual components of the device determine the functionality of the device.

Building upon the example of a connector device providing a communication channel according to one or more communication standards between two computing devices, the characteristics of the connector device and the communication channel provided by the connector device determine whether the connector device is functional to serve as a communication channel according to different communication standards. For example, the Peripheral Component Interconnect Express (PCIe) standard may function optimally with a connector device having a connector impedance of 85 Ohms, whereas the Serial Attached SCSI (SAS) standard (where SCSI is an acronym for Small Computer System Interface) may function optimally with a connector device having a connector impedance of 100 Ohms. Thus, the impedance characteristics of the connector device and the communication channel provided by the connector device affect whether and to what extent the connector device is functional with different standards. For example, an individual connector device assembled from individual components that result in the individual connector device having an impedance of 100 Ohms may communicate data better according to the SAS standard than the PCIe standard.

To determine the characteristics and thus functionality of an individual connector device with regard to different communication standards, signal characteristics of the individual components making up the connector device are compiled to determine the signal characteristics of the connector device, for example, connector device impedance. To this end, component signal characteristics stored in the non-volatile memory devices of individual components are accessed and used to determine the signal characteristics of the assembled connector and the communication channel provided by the connector device, for example, impedance. Based on the signal characteristics of the connector device, the functionality of the connector device is determined, for example it is determined to what extent the connector device is operable for communication using different communication standards. A characteristic impedance of 85 or 100 Ohms may be desired for a PCIe or SAS interconnect as connector impedance.

Figure 2:
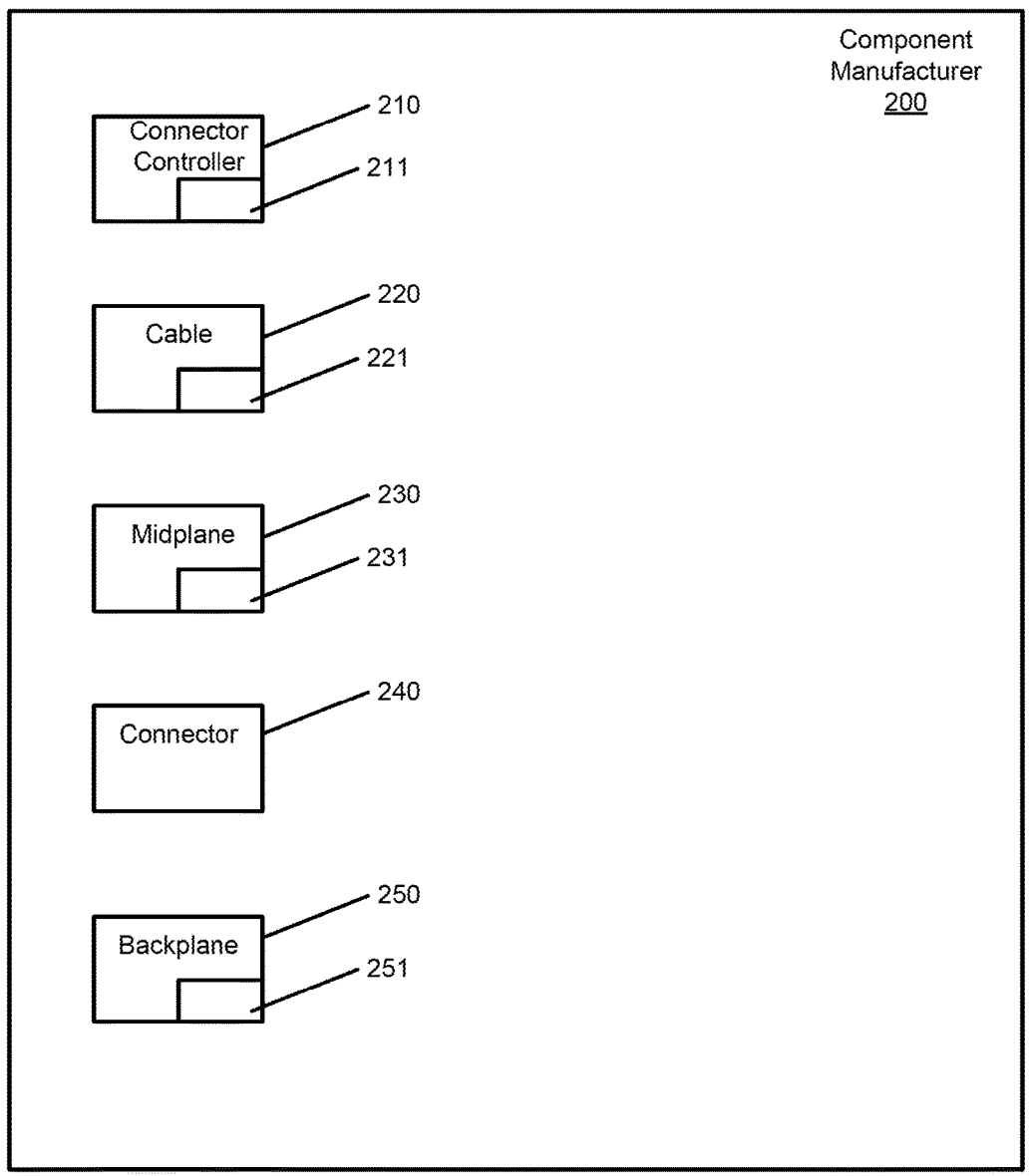
FIG. 2 illustrates components manufactured at a manufacturer.

In FIG. 2, at component manufacturer 200, connector controller, cable, midplane, connector, and backplane components are manufactured within manufacturing tolerances and as such characteristics of the components vary from individual component to individual component within manufacturing tolerances. A non-volatile memory device such as an Electrically Erasable Programmable Read-Only Memory (EEPROM) is attached to components such that the non-volatile memory device forms part of the associated component.

For example, connector controller component 210 is manufactured at component manufacturer 200 within manufacturing tolerances and non-volatile memory 211 is attached to controller component 210. The individual characteristics of controller component 210 are measured by component manufacturer 200 and stored on attached non-volatile memory 211. For example, these characteristics may include signal integrity characteristics such as impedance, crosstalk, and loss per inch. Cable component 220 is manufactured at component manufacturer 200 within manufacturing tolerances and non-volatile memory 221 is attached to cable component 220. The individual characteristics of cable component 220 are measured by component manufacturer 200 and stored on attached non-volatile memory 221. For example, these characteristics may include signal integrity characteristics such as impedance, crosstalk, and loss per inch. Midplane component 230 is manufactured at component manufacturer 200 within manufacturing tolerances and non-volatile memory 231 is attached to midplane component 230. The characteristics of midplane component 230 are measured by component manufacturer 200 and stored on attached non-volatile memory 231. For example, these characteristics may include signal integrity characteristics such as impedance, crosstalk, and loss per inch. Connector component 240 is manufactured at component manufacturer 200 within manufacturing tolerances. The characteristics of connector component 240 may be known or extrapolated from manufacturing tolerances. For example, these characteristics may include signal integrity characteristics such as impedance, crosstalk, and loss per inch. Backplane component 250 is manufactured at component manufacturer 200 within manufacturing tolerances and non-volatile memory 251 is attached to backplane component 250. The characteristics of backplane component 250 are measured by component manufacturer 200 and stored on attached non-volatile memory 251. For example, these characteristics may include signal integrity characteristics such as impedance, crosstalk, and loss per inch.

Thus multiple components such as connector controller, cable, midplane, connector, and backplane components, including connector controller component 210, cable component 220, midplane component 230, connector component 240, and backplane component 250, are manufactured at component manufacturer 200 and individual characteristics of individual components are measured and stored on the respective non-volatile memories, or known or extrapolated. The above manufacture of multiple components such as connector controller, cable, midplane, connector, and backplane components at component manufacturer 200 is by way of example, and different types of components and different components may be manufactured at different manufacturers.

When multiple components are received at a device assembler and assembled into devices at the device assembler, the individual characteristics of the components may be read from the non-volatile memories associated with individual components and used to determine the characteristics of an assembled device. When the non-volatile memory device is an EEPROM, the characteristics of the components of the device may be determined subsequent to assembly by providing a power supply to the assembled device and reading the characteristics of the components of the device from the EEPROMs attached to the component components of the device which will be supplied with power such that the EEPROMs may be read by code running on a processor attached to the device to read the EEPROMs of the components of the device.

Figure 3:
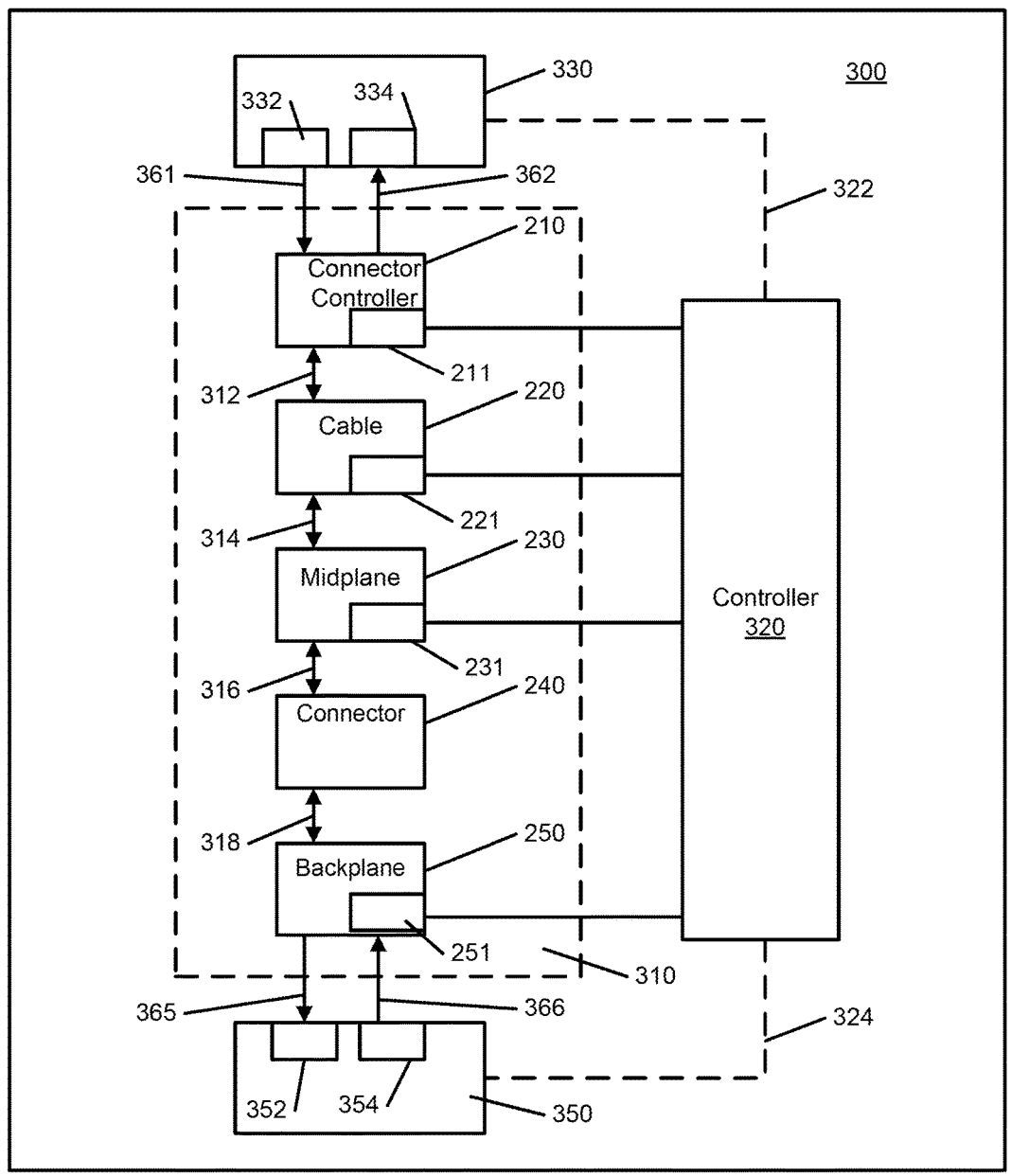
FIG. 3 illustrates an information handling system.

FIG. 3 shows an assembled information handling system 300 assembled at a device assembler. Information handling system 300 may be a server system or device. Information handling system 300 includes information handling system 330 and information handling system 350. In embodiments, information handling systems 330 and 350 may be computing devices and will be referred to as computing devices 330 and 350 hereafter. Information handling system 300 includes controller 320 which may be an information handling system. Controller 320 provides functionality that helps deploy, update, monitor, and maintain information handling system 300. Controller 320 may be considered to be an information handling system controller, and differ from a connector controller of connector device 310.

Information handling system 300 further includes connector device 310 which connects computing devices 330 and 350 so that computing devices 330 and 350 may communicate with each other over one or more channels provided by connector device 310. As such, connector device 310 may be considered a connection or link between computing devices 330 and 350 in assembled information handling system 300. Connector device 310 is assembled from connector controller component 210, cable component 220, midplane component 230, connector component 240, and backplane component 250 manufactured as described above with regard to FIG. 2 such that each component 210, 220, 230, and 250 has a respective attached memory 211, 221, 231, and 251 storing the individual signal integrity characteristics for the individual component. As discussed above, connector 240 signal integrity characteristics may be known or extrapolated.

Controller component 210 is coupled to cable component 220 by coupling 312, cable component 220 is coupled to midplane component 230 by coupling 314, midplane component 230 is coupled to connector component 240 by coupling 316 and connector component 240 is coupled to backplane component 250 by coupling 318 to form connector device 310. Computing device 330 includes transmitter 332 and receiver 334. Transmitter 332 is coupled to connector device 310 by coupling 361 to transmit data to and over one or more channels provided by connector device 310. Receiver 334 is coupled to connector device 310 by coupling 362 to receive data from one or more channels provided by connector device 310. Computing device 350 includes receiver 352 and transmitter 354. Receiver 352 is coupled to connector device 310 by coupling 365 to receive data from one or more channels provided by connector device 310. Transmitter 354 is coupled to connector device 310 by coupling 366 to transmit data to and over one or more channels provided by connector device 310. Thus computing devices 330 and 350 may communicate with each other over one or more channels provided by connector device 310 and as such may be considered in-band devices as both computing devices 330 and 350 communicate over connector device 310.

Controller 320 may be considered to be an out-of-band device relative to in-band computing devices 330 and 350 because controller 320 does not communicate over connector device 310 and as such is out-of-band relative to a channel provided by connector device 310. Controller 320 is coupled to memories 211, 221, 231, and 251 of respective components 210, 220, 230, 240, and 250 and is operable to access said memories and read the corresponding signal integrity characteristics for components 210, 220, 230, and 250. Signal integrity characteristics of connector 240 may be provided to controller 320. From the individual signal characteristics of individual components 210, 220, 230, 240, and 250, for example impedance, controller 320 determines the signal characteristics of connector device 310, for example impedance. Thus, controller 320 can determine the signal characteristics of connector device 310 and the connection(s) and channels provided by connector device 310 to connect computing devices 330 and 350 by accessing the memories of constituent components of connector device 310. When memories 211, 221, 231, and 251 are EEPROMS, power is proved to the memories so that they may be accessed by controller 320.

Computing devices 330 and 350 may configure their constituent transmitters and receivers to transmit and receive, respectively, over connector device 310 according to one or more standards, for example, PCIe or SAS. For example, computing device 330 may configure transmitter 332 and receiver 334 for transmission and reception over connector device 310 upon an installation of information handling system 300, power-up of information handling system 300, a reset of information handling system 300, a reconfiguration executed internal to information handling system 300, or an interrupt occurring in information handling system 300. Analogously, computing device 350 may configure receiver 352 and transmitter 354 for reception and transmission over connector device 310 upon an installation, power-up, a reset, a reconfiguration, or an interrupt occurring with regard to information handling system 300.

Configuration of receiver 332 and transmitter 334 of computing device 330, and configuration of receiver 352 and transmitter 354 of computing device 350 may be based in part on characteristics of connector device 310 to compensate for characteristics of the channels and connections provided by connector device 310 between computing device 330 and 350. As shown in FIG. 3, controller 320 is in communication with computing device 330 over connection 322 and is in communication with computing device 350 over connection 324. Controller 320 may determine the signal integrity characteristics of device connector 310 as described above, and may provide these signal characteristics to computing devices 330 and 350 over connections 322 and 324 respectively, or may provide configuration parameters to computing devices 330 and 350 based on signal integrity characteristics of device connector 310. Then, based on the determined signal characteristics of device connector 310, the respective transmitters and receivers of computing devices 330 and 350 may be configured for communication over device connector 310.

For example, transmitter and receiver parameters set in firmware of computing devices 330 and 350 may be configured for communication over connector device 310 based on signal integrity characteristics of connector device 310 determined and provided by out-of-band controller 320. Similarly, transmitter and receiver settings for impedance, transmitter voltage, receiver termination, and signal emphasis/de-emphasis in computing devices 330 and 350 may be configured for communication over connector device 310 based on signal characteristics of connector device 310 determined and provided by out-of-band controller 320.

In an embodiment, signal characteristics of connector device 310 are determined and provided by out-of-band controller 320 to computing devices 330 and 350. Subsequently, computing devices 330 and 350 adjust and set the setting of their respective transmitter and receiver based on the provided signal characteristics of connector device 310 and an in-band negotiation between each other conducted over connector device 310.

In an embodiment, signal integrity characteristics of connector device 310 are determined by out-of-band controller 320 based on accessing memories 211, 221, 231, 241, and 251 of connector device 310 components and reading the respective signal integrity characteristics stored therein as described above. Controller 320 may then determine transmitter and receiver setting for the respective transmitter and receivers of computing devices 330 and 350. Controller 320 then provides the respective determined transmitter and receiver settings to computing devices 330 and 350 which then configure their respective transmitter and receiver according to the settings provided by controller 320. Controller 320 may access a look-up table stored in memory of controller 320 and determine the respective transmitter and receivers of computing devices 330 and 350 based on comparing signal integrity characteristics with parameters and setting set forth in the look-up table. Controller may use the determined signal integrity characteristics of device connector 310 and may also use the individual signal characteristics of one or more components of device connector 310.

Computing devices 330 and 350 with configured transmitter and receiver settings may conduct in-band negotiations over device connector 310 to set up one or more channels, connections, or links for communication over device connector 310. For example, computing devices 330 and 350 may communicate over one or more channels provided by connector device 310 using SAS or PCIe standards, and the transmitters and receivers of computing devices 330 and 350 may be configured to communicate based on the determined signal integrity characteristics of device connector 310 or signal integrity characteristics of one or more components of device connector 310. The settings of the transmitters and receivers of computing devices 330 and 350 configured for communication may be proprietary settings available to the manufacturer or published settings made public.

The settings of the transmitters and receivers of computing devices 330 and 350 may be configured for optimized bit error rate reduction or may be configured for optimized power consumption based on signal integrity characteristics determined by controller 320. While device connector 310 is shown as including a controller component, a cable component, a midplane component, a connector component, and a backplane component, this is by way of example, and different connector device embodiments may have different continuant components. In embodiments, one or more components of a connector device may not have individual measured characteristics associated therewith. For example, one or more components may not have a memory storing signal integrity characteristics attached thereto, or the attached memory may be damaged or corrupted. In such embodiments, nominal values for signal integrity characteristics may be presumed for or assigned to these components and the nominal values used in the determination of the device characteristics of the connector device.

The component manufacturer may be the device assembler. A device comprised of components may in turn be a component of a further device comprised of components, being a constituent component of the further device.

Figure 4:
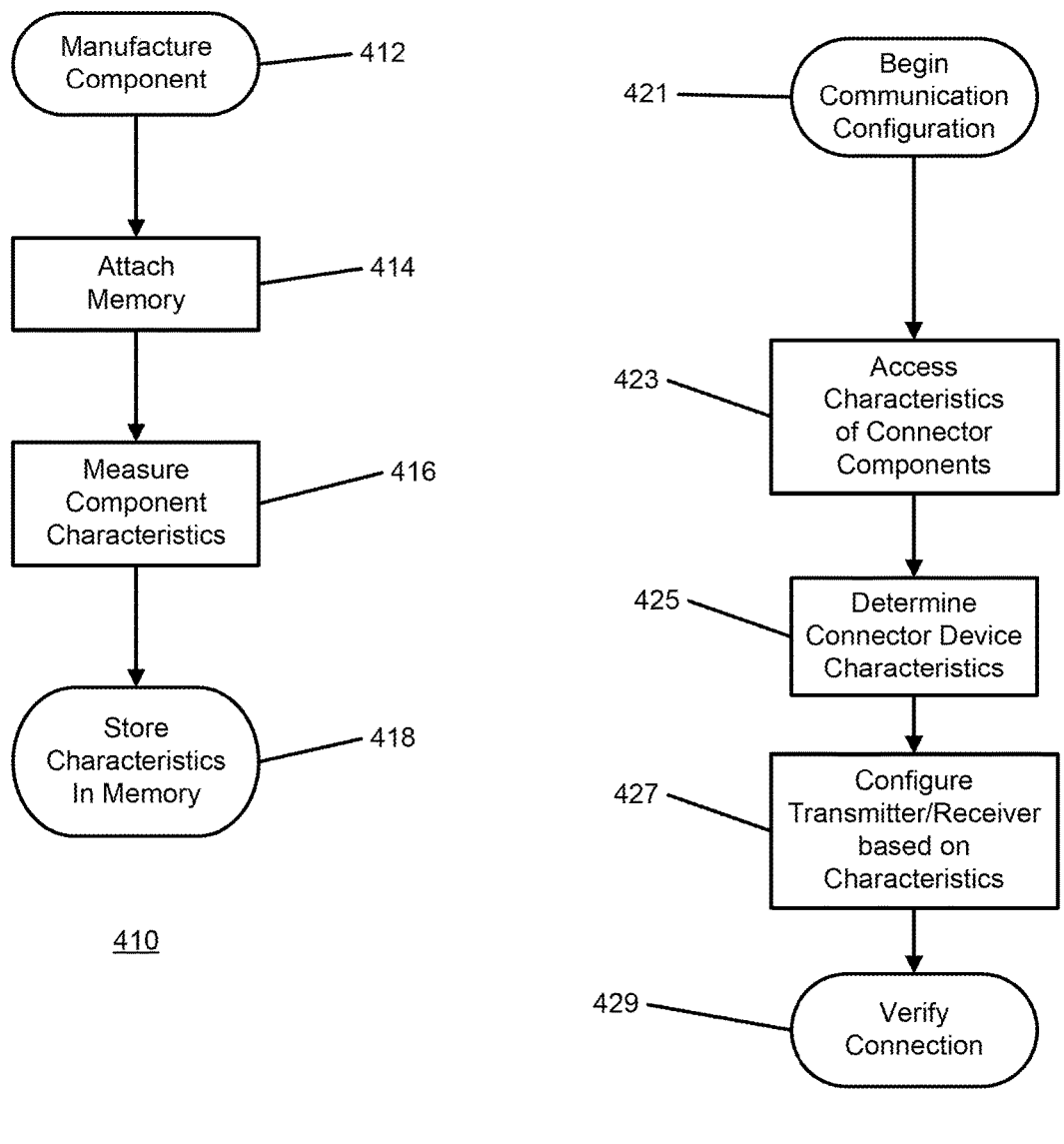
FIG. 4 illustrates processes for associating component characteristics with a component and for configuration based on characteristics.

FIG. 4 illustrates a process 410 for associating component characteristics with a component, and a process 420 for determining device characteristics of a device. In process 410, at 412, process 410 is begun by manufacture of a component. The component may be manufactured by a component manufacturer. At 414, a non-volatile memory is attached to the component such that the memory is physically part of the component. The memory may be an EEPROM, for example. At 416, the individual characteristics of the individual component are measured by measuring the component with one or more measurement devices. Characteristics measured may include signal integrity characteristics such as impedance. At 418, the measured characteristics of the component are stored in the memory attached to the component and process 410 ends.

In process 420, in-band computing devices are configured for communication over a connector device, for example, connector device 310 of FIG. 3. Namely, receiver 332 and transmitter 334 of computing device 330, and configuration of receiver 352 and transmitter 354 of computing device 350 are configured for communication over connector device 310 by setting one or more settings of receiver 332 and transmitter 334 of computing device 330, and receiver 352 and transmitter 354 of computing device 350 based on signal integrity characteristics of connector device 310 for communication according to a communication standard such as SAS or PCIe.

At 421, process 420 is begun when communication configuration is begun. As discussed above, communication configuration may be begun responsive to configuring an information handling system comprising computing devices in response to a power-up, an interrupt, or other computing device configuration trigger. At 423, signal integrity characteristics of one or more constituent components of a connector device connecting the computing devices are accessed. For example, one or more memories attached to individual component storing signal integrity characteristics of the individual components are accessed and the respective signal integrity characteristics read. When the memories are EEPROMS, the memories are provided with power by a power source prior to being accessed. At 425, the signal integrity characteristics of the connector device are determined based on the signal integrity characteristics of the constituent components. At 427, the signal integrity characteristics are used to configure the computing devices for communication over the connector device according to one to more communication standards. For example, an out-of-band controller may provide data for configuring transmitters and receivers of the computing devices for communicating according to a standard over the connector device to the computing devices. At 429, the connection between the computing devices over the connector device is verified and process 420 ends. Verifying the connection may include verifying the quality of the connection, such as, for example, the bit error rate, or otherwise quantifying the quality of the connection for one or more standards.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. An information handling system, comprising:
   a first computing device;
   a second computing device;
   a connector device connecting the first computing device and the second computing device, the connector device assembled from a set of components, each component of the set of components having a memory storing signal integrity characteristics for the component; and
   a controller connected to each of the memories, connected to the first computing device, and connected to the second computing device, the controller configured to access a look-up table, to compare the one or more signal integrity characteristics of the connector device with one or more entries of the look-up table, and to provide transmitter and receiver settings based upon the comparison.
2. The information handling system of claim 1, wherein the information handling system is a server system.
3. The information handling system of claim 1, wherein the controller is configured to access one or more of the memories and read signal integrity characteristics for the set of components from the memories.

4. The information handling system of claim 3, wherein the controller is configured to determine one or more signal integrity characteristics of the connector device from the signal integrity characteristics read from the memories.

5. The information handling system of claim 4, wherein the first computing device comprises a first transmitter and the second computing device includes a second receiver.

6. The information handling system of claim 5, wherein the first transmitter is configured to transmit over a first channel provided by the connector device according to a communication standard based on the one or more signal integrity characteristics of the connector device, and wherein the second receiver is configured to receive over the first channel provided by the connector device according to the communication standard based on the one or more signal integrity characteristics of the connector device.

7. The information handling system of claim 6, the controller is configured to determine a first set of transmitter settings for the first transmitter and a second set of receiver setting for the second receiver based on the one or more signal integrity characteristics of the connector device, and the controller is configured to provide the first set of transmitter settings for the first transmitter to the first computing device for configuration of the first transmitter according to the first set of transmitter settings.

8. The information handling system of claim 7, wherein the controller determines the first set of transmitter settings by accessing the look-up table and comparing the one or more signal integrity characteristics of the connector device with the one or more entries of the look-up table.

9. The information handling system of claim 7, wherein the communication standard is one of serial attached small computer serial interface (SAS) or peripheral component interconnect express (PCIe) standards.

10. The information handling system of claim 1, wherein the connector device comprising at least one component from a group of components, the group of components comprising: a cable component, a connector component, and a midplane component.

11. The information handling system of claim 1, wherein the memories are electrically erasable programmable read-only memories (EEPROMS).

12. An information handling system, comprising:
a first computing device;
a second computing device;
a connector device connecting the first computing device and the second computing device, the connector device assembled from constituent components, the constituent components including a first component having a first component memory storing signal integrity characteristics for the first component, the constituent components including a second component having a second component memory storing signal integrity characteristics for the second component; and
a controller connected to each of the memories, connected to the first computing device, and connected to the second computing device, the controller is configured to access a look-up table, to compare each of the signal integrity characteristics of the first component and the second component with one or more entries of the look-up table, and to provide transmitter and receiver settings based upon the comparison.

13. The information handling system of claim 12, wherein the information handling system is a server system.

14. The information handling system of claim 12, wherein the controller is configured to access the first component memory and read first component signal integrity characteristics for the first component from the first component memory.

15. The information handling system of claim 14, wherein the controller is configured to determine one or more signal integrity characteristics of the connector device based on the first component signal integrity characteristics read from the first component memory.

16. The information handling system of claim 15, wherein controller is configured to determine the one or more signal integrity characteristics of the connector device based on assumed signal integrity characteristics for the second component.

17. An information handling system, comprising:
a first computing device including a first transmitter;
a second computing device including a second receiver;
a connector device connecting the first computing device and the second computing device, the connector device assembled from a set of components, each component of the set of components having a memory storing signal integrity characteristics for the component; and
a controller connected to each of the memories, connected to the first computing device, and connected to the second computing device,
wherein the controller is configured to access one or more of the memories and read signal integrity characteristics for the set of components from the memories, and
wherein the controller is configured to determine a functionality of the connector device from the read signal integrity characteristics read from the memories.

18. The information handling system of claim 17, wherein the first transmitter is configured to transmit over a first channel provided by the connector device according to a communication standard based on the one or more signal integrity characteristics of the connector device, and wherein the second receiver is configured to receive over the first channel provided by the connector device according to the communication standard based on the one or more signal integrity characteristics of the connector device.

19. The information handling system of claim 18, the controller is configured to determine a first set of transmitter settings for the first transmitter and a second set of receiver setting for the second receiver based on the one or more signal integrity characteristics of the connector device, and the controller is configured to provide the first set of transmitter settings for the first transmitter to the first computing device for configuration of the first transmitter according to the first set of transmitter settings.

20. The information handling system of claim 19, wherein the first transmitter and the second receiver negotiate a connection over the first channel based on the one or more signal integrity characteristics of the connector device.

* * * * *